May 9, 1950 W. W. H. DEAN 2,507,145

PEAK LIMITING EXPANDING AMPLIFIER

Filed July 2, 1947 2 Sheets-Sheet 1

INVENTOR.
William W. H. Dean

BY Harry Tunick

ATTORNEY

May 9, 1950 W. W. H. DEAN 2,507,145

PEAK LIMITING EXPANDING AMPLIFIER

Filed July 2, 1947 2 Sheets-Sheet 2

INVENTOR.
William W. H. Dean
BY Larry Tunick
ATTORNEY

Patented May 9, 1950

2,507,145

UNITED STATES PATENT OFFICE 2,507,145

PEAK LIMITING EXPANDING AMPLIFIER

William W. H. Dean, Pointe Claire, Quebec, Canada, assignor to Radio Corporation of America, a corporation of Delaware Application July 2, 1947, Serial No. 758,693

5 Claims. (Cl. 179—171)

In this application, I disclose a new and improved speech amplifier for use as a transmitter modulator.

The primary purpose of my invention is to increase the effective power of a modulated radio frequency carrier.

Another purpose of my invention is to increase the effective power of a modulated radio frequency carrier and at the same time to insure that overmodulation of the carrier causing sideband splatter does not take place.

To attain these objects, a new and improved speech amplifier is provided wherein the ratio of the average to peak power of the speech is increased so that a much higher average power output from the amplifier is obtained without exceeding the amplifier peak power rating.

An additional purpose of my invention is to provide an amplifier as described above with means therein to suppress background noise which would normally result from increasing the ratio of the average to peak power.

My amplifier is a speech amplifier incorporating a peak clipper to limit the maximum peak amplitude and an expander to reduce the gain in the absence of input signal. When this amplifier feeds limited expanded speech to a modulator, the effective carrier output may be greatly increased without undesirable overmodulation taking place. Moreover, the expander has the additional purpose of suppressing background noise so that the carrier is not modulated by the same during blank intervals in the application of the speech to the transmitter.

The clipping action creates harmonics and my novel system includes a low pass filter in the clipper output ahead of the modulator stage to remove the harmonics falling above the speech frequency band before the same is used to modulate the carrier. It has been found that the intelligence is carried by the low level sounds in speech so that the high level peaks may be clipped off without loss of intelligence. In practice, the highest peaks can be clipped 20 to 25 db. before intelligibility is affected. The expander feature is required to suppress background or room noise which is increased above normal by the same amount as the speech is clipped. During pauses in speech, the additional 20 or 25 db. of background noise would prove objectionable.

My improved speech amplifier has numerous uses in the radio and allied arts. For example, it may be used in a two-way communication system. Then one amplifier supplies amplified speech to an outgoing channel (which may feed the transmitter) and another amplifier amplifies the incoming speech. Where the amplifiers use common lines or portions thereof singing may take place. Another object of my present invention is to prevent such singing by automatically blocking off one amplifier when speech is applied to the other and vice versa. This is done electronically and without appreciable time delay by developing a voltage in each amplifier on application of speech thereto which acts on an electrode in the other amplifier to block said other amplifier.

Figure 1:
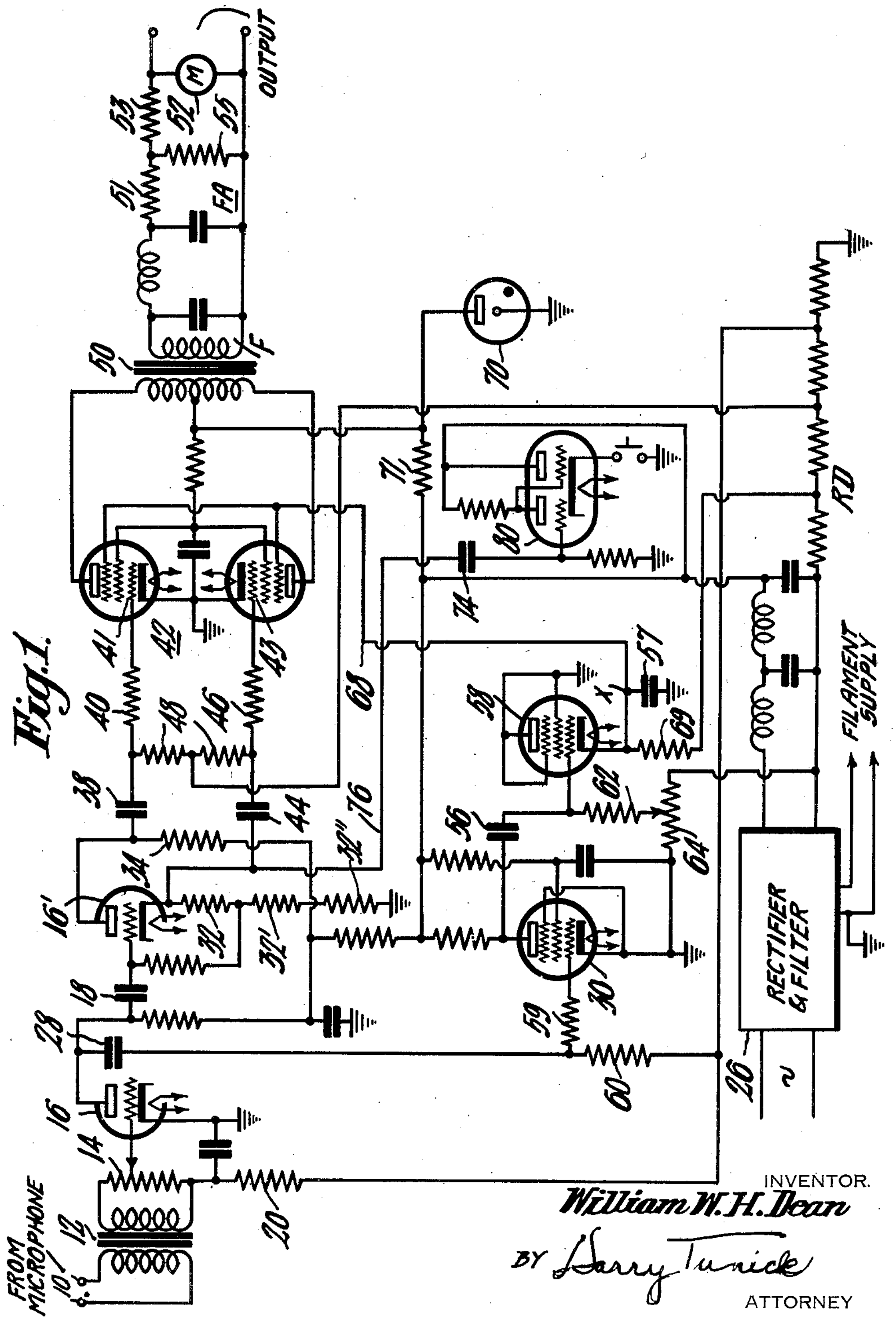
Figure 2:
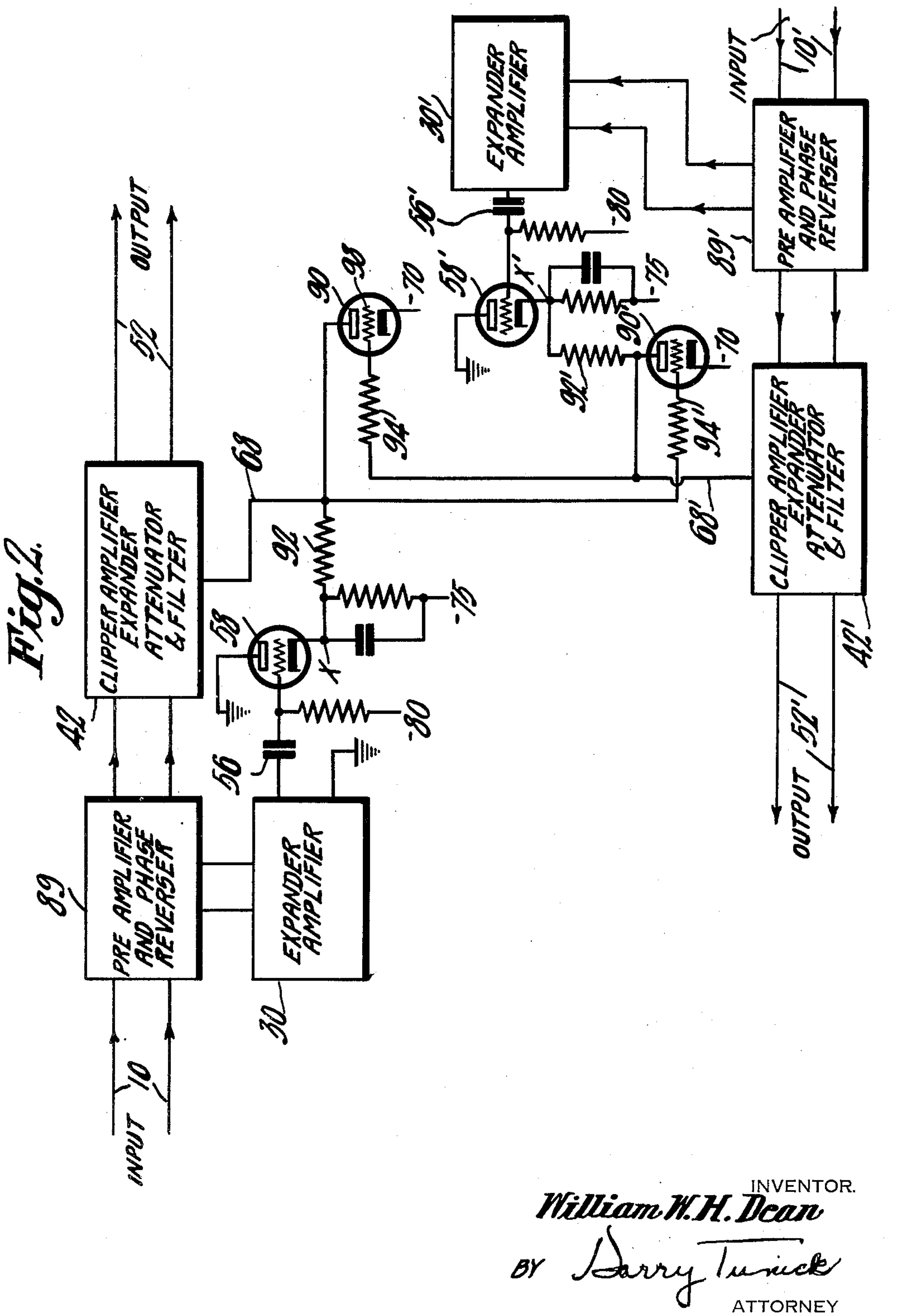

In describing my invention in detail, reference will be made to the attached drawings, wherein Fig. 1 illustrates by circuit element and circuit element connections, an amplifier including the novel features described above all arranged in accordance with my invention, and Fig. 2 illustrates my improved means for blocking operation in one amplifier on application of speech to the other amplifier.

In the drawings, 10 indicates the input of the peak limiting expanding amplifier whereat the signal such as speech is applied to the primary winding of a transformer 12 the secondary winding of which is shunted by potentiometer 14. The movable point on the potentiometer is connected to the control grid of an electron discharge device 16, having its electrodes coupled in a circuit which is substantially conventional except for differences explained hereinafter. The triode 16 which is an amplifying and coupling stage has its anode coupled by a condenser 18 to the control grid of a phase inverting tube 16'. Tubes 16 and 16' may be in a common envelope as shown or may be in separate envelopes. Bias for the control grid of tube 16 is supplied by a resistor 20 coupled to a point on the resistor voltage divider RD in the output of a rectifier system 26. The anode of tube 16 is also coupled by condenser 28 to an additional stage tube 30 described hereinafter.

The tube 16' is a phase inverter in a substantially conventional circuit with cathode biasing resistors 32 and 32' and an adjustable resistor 32''. The control grid is coupled by a self-biasing circuit to a point intermediate resistors 32 and 32'. This phase inverter tube has two outputs, one in its cathode return circuit making use of the potential drop at the resistor 32 and the other in its anode circuit making use of the potential drop across the anode load resistor 34. Moreover, these outputs are of opposed polarity since the cathode voltage follows the input voltage and the anode voltage is opposed thereto.

The anode is coupled by capacitor 38 and potential limiting resistor 40 to the control grid 41 of one tube of a push-pull stage 42. The cathodes of the push-pull stage are grounded and the grid biasing circuits are completed through resistors 48 and a portion of the potential divider RD. The anodes of the tubes of the push-pull stage 42 are coupled to an output transformer 50, the secondary winding of which is connected by a filter F to the output leads 52.

The current peak limiting action which I seek is carried out as explained hereafter in the grid circuits of the tubes of stage 42.

The expanding operation is carried out by the following apparatus. The signal as stated above is applied by capacitor 28 to the grid of tube 30 wherein it is amplified and fed by capacitor 56 to the control grid of rectifier tube 58. The control grid of tube 30 is biased by resistor 60 and a portion of the voltage divider RD. The control grid of the tube 58 is biased by resistor 62 and an adjustable portion of resistor 64 and the resistance voltage divider RD. Resistor 64 adjusts the magnitude of signal voltage at which conduction starts in rectifier 58. The anode and two outer grid-like electrodes of tube 58 are tied together and grounded and included with the cathode of tube 58 in a rectifier circuit which is completed through a portion of the voltage divider RD. The cathode of tube 58 is connected by lead 68 to the suppressor grids in the push-pull amplifier stage 42.

In order to maintain constant potential on the anodes and screening electrodes of the amplifier stage 42 and on the anode of coupling and amplifier tubes 16 and 16′ and on the anode and screen grid of tube 30, a voltage regulator 70 is coupled across the output of the power supply rectifier 26 filter. The clipping indicating tube 80 has its control grid coupled to one side of the push-pull amplifier system. For example, such grid is coupled to the cathode of tube 16′ by coupling capacitor 74 and lead 76.

In operation, the signal is applied to the control grid of tube 16. Tube 16 feeds amplified speech to the phase inverter tube 16′. Potentiometer resistor 32″ provides means for balancing out any discrepancies in the resistance of the stage so that the voltages appearing on the grids 41 and 43 of the stage 42 are equal or substantially equal. The adjustable resistor 32″ is set so that the voltage drop across resistor 32 as it appears on the grid 43 through condenser 44 equals the voltage drop across resistor 34 as it appears on the grid 41.

The peak clipping is accomplished in the grid circuit of the output stage. The tubes of stage 42 are adjusted for class AB operation. By placing high resistors 40 and 46 in series with each grid 41 and 43, the positive signal peaks (with respect to the individual tubes) cause grid current to flow as soon as the input signal level exceeds the direct current bias. The resultant decrease in tube input impedance causes any further increase in signal voltage to appear across the grid resistors and very little increase in output from the tube fed by the said grid resistor is obtained. The negative peaks (with respect to each tube) are eliminated from the limiter stage output by the following method. The bias on this stage 42 is so chosen by dimensioning resistors 40, 46 and 48 and selecting the point at which the latter are connected to the voltage divider RD that the negative signal peak at the first grid of the stage 42 causes that tube to cut off before the clipping level is reached at the second grid (the same signal being positive at the second grid at the same time it is negative at the first grid). No adjustment is possible in the level at which clipping takes place but the output level of the stage 42 is arbitrarily adjusted by choice of the fixed attenuator FA comprising resistors 51, 53 and 55 following the low pass filter F. The low pass filter F supplies signal voltages limited in stage 42 and attenuated in FA to the output leads 52.

The low pass filter F is required to prevent the higher order harmonics of the signal, which are a product of the clipping, from appearing as modulation on the radiated carrier. This is an important feature of my invention. The limiting action is necessary for reasons pointed out in detail above. In carrying out the same, harmonics of the signal frequencies are generated and those harmonics which fall above the signal frequency band must be removed before the signal is used to modulate the carrier.

As more clipping is employed in the stage 42, the operating level increases. This has the effect of having the background or room noise modulate the transmitter connected at 52 to an objectionable degree. To offset this, the expander feature of the amplifier, the operation of which will be explained, allows a reduction of gain between words and during the longer breaks in speech. The expander control resistor 64 is adjusted so that with a microphone on, but no intelligence being supplied to the input 10, the background or room noise is not heard except for occasional peaks coming through.

Expansion is accomplished by varying the voltage on the suppressor grids 41′ and 43′ of the peak limiting amplifier stage 42. These grids are connected to the cathode of the expander rectifier 58 by lead 68. The expansion is in proportion to the average signal magnitude. To obtain sufficient control voltage to increase the gain to normal with normal input, the separate amplifier stage 30 fed from the plate of the input tube 16 is used. This amplifier consists of a resistance coupled stage tube 30. A high resistance 59 is placed in series with its grid to prevent loading of the signal amplifier circuit at high input levels when current flows in the grid circuit of this tube. The amplifier signal is applied from the anode of this tube 30 by coupling condenser 56 to the infinite impedance rectifier 58. This tube 58 has its anode and two outer grids tied together so that it is in triode operation with plate rectification taking place. As the plate of this tube is grounded and the cathode is connected by resistor 69 to a point on the voltage divider RD which is negative, in the absence of signal the cathode will be at the same potential or substantially so as the supply potential at RD when the grid of this tube is more negative than the cathode (beyond cutoff). This grid bias is adjusted by adjusting potentiometer 64. As the input signal to the rectifier increases the cutoff bias on tube 58 is overcome and a plate current starts to flow in tube 58 causing the cathode to become more positive or less negative thereby reducing the negative bias on the suppressor grids of the output limiter stage 42. The circuit is so arranged that the plate impedance of the infinite impedance rectifier 58 rapidly reaches a low value and the suppressor electrode voltage for stage 42 approaches zero or ground potential. Actually, almost full output gain is reached in stage 42 when the suppressors are below 10 volts negative.

The expander rectifier 58 cathode is bypassed to ground by a capacitor 57 which discharges quickly through the tube 58 but charges relatively slowly through resistor 69 when the signal input is removed. This charge time may be so chosen as to maintain the amplifier gain at a high level between syllables but to permit it to decrease during the longer pauses in speech. The input level required to reach full amplifier gain is controlled by the adjustment of potentiometer 64. When the expander rectifier 58 grid is highly negative with respect to its cathode, the required signal must almost reach the clipping level. At the other extreme of the control setting, this grid is highly positive with respect to the cathode supply point and the amplifier gain is the maximum even in the absence of signal. Then, no expansion can take place or it might be said the expansion control is inoperative.

When the expander is set for maximum effect, the output limiter stage 42 plate current is almost zero with no input being fed to this limiter stage. To prevent this change in current, with the expander in operation, from adversely affecting the performance of the limiting expanding amplifier, voltage regulator tube 70 is placed across the supply source. The current through resistor 71 is then essentially constant for all conditions of operation.

In order to indicate when peak clipping is taking place, electron tuning indicator tube 80 is coupled by condenser 74 across one-half of the signal input circuit to the final amplifying and limiting stage 42. The shadow angle of the eye tube follows the speech peaks and closes at approximately the level at which clipping occurs. Due to the constants in the indicator grid circuit, a slight lag in opening of the eye is introduced, making it easy to determine when the shadow angle reaches zero.

Actual tests under typical operating conditions show that the effective carrier level is raised by 10 to 14 db. for 20 db. of clipping. A similar test with a type of peak limiter using a finite recovery time (such as are presently used in broadcasting) gave an effective gain of only 1 to 3 db.

When one amplifier is to block operation of another similar amplifier, the arrangement is as in Figure 2. An additional tube structure 90 is supplied in the same envelope with tube 58 (here shown as a three-electrode tube) or in a separate envelope. The anode of tube 90 is connected to the point X by a resistor 92. The grid 98 of tube 90 is connected by a grid bias limiting resistor 94 to the anode of a tube 90′ similar to 90 and to the point X′ by resistor 92′. The grid of tube 90′ is connected to the anode of tube 90 by resistor 94′. Negative potentials about as shown are applied to the cathodes and grids of tubes 58 and 58′ and to the cathodes of tubes 90 and 90′.

Now, assume signal comes in at input 10′ and is applied to the expander amplifier 30′ through preamplifier and phase reverser 89′. The grid 98 being connected by lead 68′ to the point X′ swings to zero bias due to the potential limiting action of resistor 94. The plate of tube 90 then approaches the potential on the cathode of tube 90 (here shown as −70 volts) because tube 90 has become highly conductive. This takes place even if signal attempts to come in on the pre-amplifier 89 and to act through expander amplifier 30 to cause the voltage at point X to swing toward ground potential, i. e., less negative. Since the anode of tube 90 becomes negative approaching the potential on the cathode of tube 90, the lead 68 applies a negative bias to the suppressor grids in the limiting amplifier tubes of stage 42 and blocks these tubes so that no signal goes out on the lines 52. If speech comes in at input 10 first, tubes 58 and 90′ act in a like manner to apply a blocking potential to the suppressor grids in push-pull limiter stage 42′ to prevent this amplifier from sending signals out on line 52′.

What is claimed is:

1. In a speech amplifier in combination, a voltage peak clipper stage of variable gain having an input excited by voltages representing speech, said gain being variable in response to a gain control potential applied to said clipper stage, and a cathode follower voltage derivation stage, said derivation stage having a cathode circuit with a parallel connected resistor-condenser combination therein and having also an input to which said speech voltages are applied, thereby to derive a gain control potential across said resistor condenser combination, said gain control potential being applied to said clipper stage to control the gain thereof.

2. In a speech amplifier in combination, a voltage peak clipper stage of variable gain having an input excited by voltages representing speech, said gain being variable in response to a gain control potential applied to said clipper stage, and a cathode follower voltage derivation stage, said derivation stage including a vacuum tube having a cathode circuit with a parallel connected resistor-condenser combination therein, the condenser of said combination discharging through said tube and charging through the resistor thereof, and having also an input to which said speech voltages are applied, thereby to derive a gain control potential across said resistor-condenser combination, said gain control potential being applied to said clipper stage to control the gain thereof.

3. In a speech amplifier in combination, a voltage peak clipper stage of variable gain including a vacuum tube having a gain control element and having also an input excited by voltages representing speech, said gain being variable in response to a gain control potential applied to said element, and a cathode follower voltage derivation stage, said derivation stage including a vacuum tube having a cathode circuit with a parallel connected resistor-condenser combination therein and having also an input to which said speech voltages are applied, thereby to derive a gain control potential across said resistor-condenser combination, said gain control potential being applied to said element to control the gain of said clipper stage.

4. In a speech amplifier in combination, a push-pull voltage peak clipper stage of variable gain including a pair of vacuum tubes in push-pull circuit each having a gain control element and having also an input excited by voltages representing speech, said gain being variable in response to a gain control potential applied to said elements, and a cathode follower voltage derivation stage, said derivation stage including a vacuum tube having a cathode circuit with a parallel connected resistor-condenser combination therein and having also an input to which said speech voltages are applied, thereby to derive a gain control potential across said resistor-condenser combination, said gain control potential being applied to said elements to control the gain of said clipper stage.

5. In a speech amplifier in combination, a voltage peak clipper stage of variable gain including a vacuum tube having a gain control grid and having also an input excited by voltages representing speech, said gain being variable in response to a gain control potential applied to said grid, and a cathode follower voltage derivation stage, said derivation stage including a vacuum tube having a cathode circuit with a parallel connected resistor-condenser combination therein and having also a grid to which said speech voltages are applied, thereby to derive a gain control potential across said resistor-condenser combination said gain control potential being applied to said grid to control the gain of said clipper stage.

WILLIAM W. H. DEAN.

REFERENCES CITED

The following references are of record in the file of this patent:

UNITED STATES PATENTS

| Number | Name | Date |
|---|---|---|
| 2,096,756 | Purington | Oct. 26, 1937 |
| 2,250,596 | Mountjoy | July 29, 1941 |
| 2,293,528 | Barco et al. | Aug. 18, 1942 |
| 2,340,364 | Bedford | Feb. 1, 1944 |
| 2,392,384 | Howard | Jan. 8, 1946 |
| 2,397,830 | Bailey | Apr. 2, 1946 |
| 2,398,596 | Price | Apr. 16, 1946 |